(12) United States Patent
Jones

(10) Patent No.: US 8,497,592 B1
(45) Date of Patent: Jul. 30, 2013

(54) UTILITY POLE MOUNTABLE VERTICAL AXIS WIND TURBINE

(76) Inventor: Thomas Jones, Belle, MO (US)

( * ) Notice: Subject to any disclaimer, the term of this patent is extended or adjusted under 35 U.S.C. 154(b) by 64 days.

(21) Appl. No.: 13/222,629

(22) Filed: Aug. 31, 2011

(51) Int. Cl.
*F03D 9/00* (2006.01)

(52) U.S. Cl.
USPC .............................................. 290/44; 290/55

(58) Field of Classification Search
USPC ..................................................... 290/44, 55
See application file for complete search history.

(56) References Cited

U.S. PATENT DOCUMENTS

| | | | |
|---|---|---|---|
| 7,186,802 B2 * | 3/2007 | Youakim et al. | ............... 530/350 |
| 7,303,369 B2 | 12/2007 | Rowan et al. | |
| 7,352,076 B1 | 4/2008 | Gabrys | |
| 2006/0263198 A1 | 11/2006 | Kinkaid | |
| 2009/0200808 A1 | 8/2009 | Parmley, Sr. | |
| 2009/0224554 A1 | 9/2009 | Flynn | |
| 2009/0224606 A1 | 9/2009 | Gandy | |
| 2010/0013238 A1 | 1/2010 | Jessie et al. | |
| 2011/0025070 A1 * | 2/2011 | Price | ............................... 290/55 |
| 2011/0062717 A1 * | 3/2011 | Price, Jr. | ......................... 290/55 |

* cited by examiner

*Primary Examiner* — Tho D Ta
(74) *Attorney, Agent, or Firm* — Goldstein Law Offices, P.C.

(57) ABSTRACT

A vertical axis wind turbine for attaching to a utility pole includes a plurality of support arms, a housing, a generator and a plurality of blades. The support arms attach to the utility pole. The housing is coupled between the arms. The housing includes an outer wall defining a space within the housing. The housing rotates on a vertical axis of rotation and with respect to the arms. The generator is stationed within the space. The generator generates an electric current in response to a rotation of the housing. The plurality of blades coupled to an external surface of the outer wall, one of the blades extends in a vertical direction.

20 Claims, 5 Drawing Sheets

UTILITY POLE MOUNTABLE VERTICAL AXIS WIND TURBINE

TECHNICAL FIELD

The present invention relates to wind turbines, and more specifically, to a utility pole mountable vertical axis wind turbine.

BACKGROUND

Identification of new non-fossil fuel based energy sources, which are both commercially viable and environmentally benign, has become an important national security and technological need. With increasing domestic energy consumption, such technology will not only enhance national security, reduce visual pollution, fuel economic growth, create jobs and contribute to global environmental sustainability, but also reduce foreign energy dependence.

Many countries and businesses often commit to make better use of renewable and nonpolluting energy sources. Wind energy is a popular source explored by many not just because wind energy is renewable and nonpolluting, but also because wind energy is free. Although wind farms with acres of large wind turbines have proved relatively successful, such wind farms are relatively rare and generally involve substantial economic investment, visual pollution and contentious land use issues. A broader, simpler, more visually appealing and geographically universal wind turbine construction and management approach may be required to bring wind energy to its full potential.

Also, in United States, utility poles are ubiquitous and often include power transmission capabilities. In fact, miles of open roads, spreading through wide open spaces, are lined with a seemingly endless amount of utility poles. A significant amount of wind energy, which often encounters these poles, remains underutilized. Thus, by better utilizing already existing utility poles for wind energy generation, increasing domestic energy consumption can be more effectively managed without substantial economic investment.

Additionally, some electric utility companies, such as electric distribution cooperatives, do not generate electric power. Rather, these companies purchase electricity from another entity. Thus, these companies are caught in the middle of a vibrant energy supply and demand market and, generally, do not have control over rising energy costs. Similarly, these companies also often face arbitrary political mandates or unreasonable customer demands for prompt provision of renewable energy without having any control over how to provide such energy.

Accordingly, there may be a need to more efficiently create and distribute renewable energy, decrease dependency on centralized electric energy generation, lessen fossil fuel use in electricity generation, minimize foreign energy dependence, reduce the price of electricity, create a new renewable energy business model, while implementing a job creating solution using an already existing infrastructure.

While the foregoing may be suitable for the particular purpose employed, or for general use, they would not be as suitable for the purposes of the present invention as disclosed hereafter.

BRIEF SUMMARY

It is an object of an example embodiment of the invention to provide a vertical axis wind turbine.

An example embodiment of the invention includes a vertical axis wind turbine for attaching to a utility pole. The turbine includes a plurality of support arms, the support arms attach to the utility pole. The turbine also includes a housing coupled between the arms, the housing includes an outer wall defining a space within the housing, the housing rotates on a vertical axis of rotation and with respect to the arms. The turbine further includes a generator stationed within the space, the generator generates an electric current in response to a rotation of the housing. The turbine even further includes a plurality of blades coupled to an external surface of the outer wall, one of the blades extends in a vertical direction.

Another example embodiment of the invention includes a method of manufacturing a vertical axis wind turbine. The method includes coupling a housing between a plurality of support arms, the arms attach to a utility pole, the housing includes an outer wall defining a space within the housing, the housing rotates on a vertical axis of rotation and with respect to the arms. The method also includes stationing a generator within the space, the generator generates an electric current in response to a rotation of the housing. The method further includes coupling a plurality of blades to an external surface of the outer wall, one of the blades extends in a vertical direction.

Yet another example embodiment of the invention includes a method of generating electricity. The method includes securing via a plurality of support arms a vertical axis wind turbine to a utility pole having a distribution transformer, wherein the turbine includes a housing coupled between the arms, the housing includes an outer wall defining a space within the housing, the housing rotates on a vertical axis of rotation and with respect to the arms, a plurality of blades coupled to an external surface of the outer wall, one of the blades extends in a vertical direction, a generator stationed within the space, the generator generates an electric current in response to a rotation of the housing due to wind. The method also includes connecting the turbine to the transformer so the electric current flows from the generator to the transformer.

To the accomplishment of at least one of the above and related objects, the present invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1A:
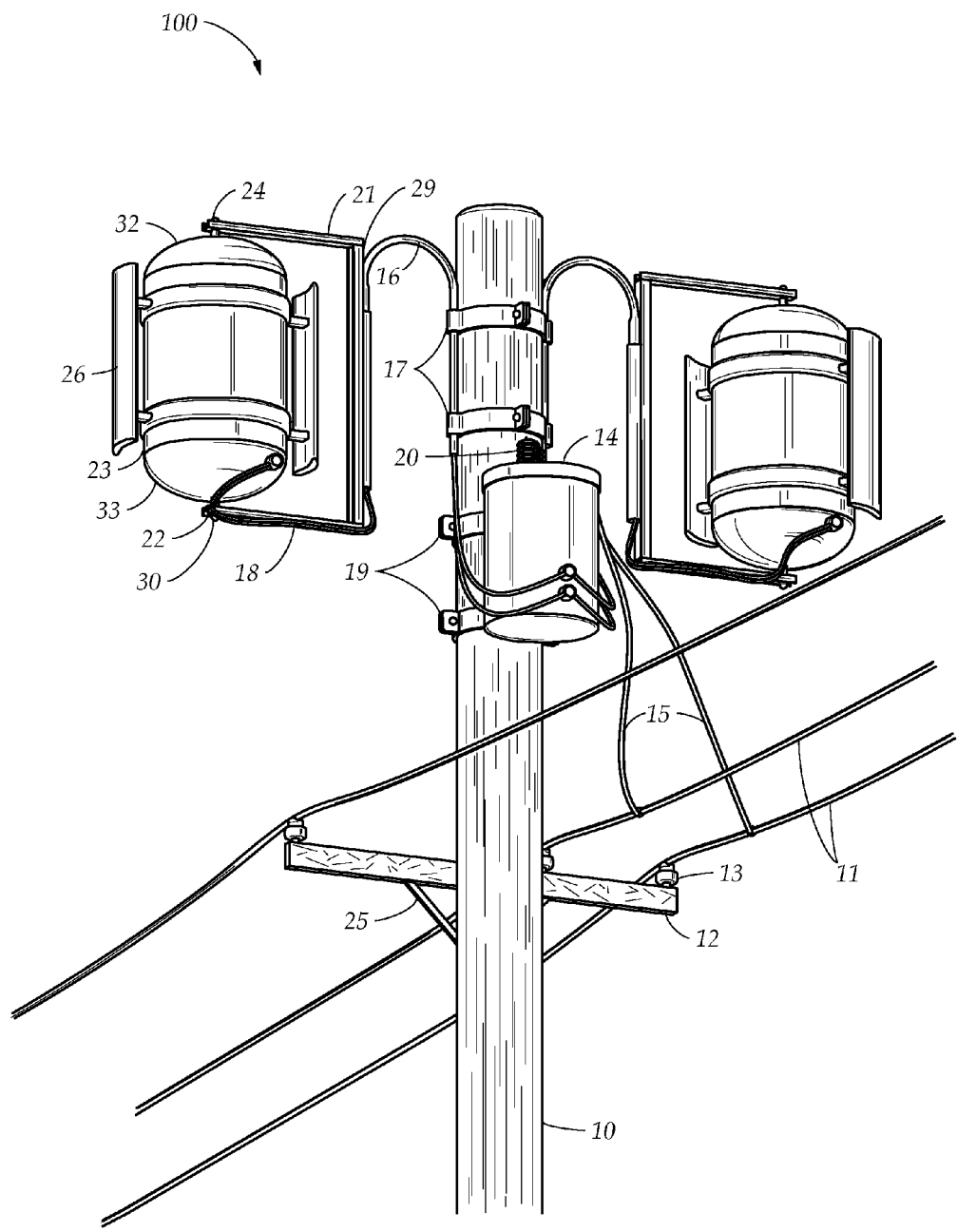
FIG. 1A illustrates an example mode of operation of a vertical axis wind turbine according to the present invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

FIG. 1A illustrates an example mode of operation of a vertical axis wind turbine according to the present invention. Any element of a vertical axis wind turbine 100 can include metal, plastic or a light-weight composite material and be rustproof. Vertical axis wind turbine 100 includes a plurality of support arms 21, 22, a housing 23, a generator and a plurality of blades 26.

Arms 21, 22 are coupled to each other via a coupling rod 29. Coupling rod 29 is coupled via a bent rod 16 to a utility pole 10 above power lines 11, which are resting on a horizontal crossarm 12 via an insulator 13. Crossarm 12 is supported by a support arm 25. In an example embodiment, arms 21, 22 are individually coupled to utility pole 10. In an example embodiment, arms 21, 22 are coupled in a V-shape, L-shape or A-shape to utility pole 10. In an example embodiment, arms 21, 22 are coupleable to a cell site, an antenna, a house roof, a transmission tower, a water tower, a lamppost or a sign pole.

Housing 23 is coupled to arms 21, 22 via caps 32, 33 and shafts 24, 30, which extend through a width of arms 21, 22. Housing 23 rotates on a vertical axis of rotation and with respect to arms 21, 22.

Housing 23 also includes an outer wall defining a space within housing 23. The space is interior space and can be sealed to be waterproof or airtight. Although housing 23 is shown in a cylindrical shape, housing 23 can be of other shapes, such as rectangular or cuboid.

A generator is stationed within the space and the generator generates an electric current in response to a rotation of housing 23. In an example embodiment, the electric current is an alternating current. The generator is coupled to a distribution transformer 14 via a wire 18, which conducts the generated electric current. The generator can include a generator shaft. Distribution transformer 14 is coupled to utility pole 10 via bands 17, which also couple bent rod 16. Bands 17 are adjustable via adjusters 19.

Blades 26 are coupled to an external surface of the outer wall of housing 23. Blades 26 extend in a vertical direction, parallel to the external surface of housing 23. Blades 26 are coupled to the external surface of housing 23 via a connector 31 and a band 28 extending around the outer wall of housing 23.

Caps 32, 33 are coupled to opposing bases of housing 23. In an example embodiment, caps 32, 33 are stationary with respect to housing 23. Although a portion of caps 32, 33 is hemispherical (domelike), in general, caps 32, 33 can be flat or rectangular or any other shape. Each cap 32, 33 includes a bearing and housing 23 rotates around the bearings. Cap 33 includes an opening 27 for wire 18, which connects to power lines 11 via distribution transformer 14, a coil 20 and connecting wires 15. Opening 27 can include a grommet. Cap 32 is coupled to arm 21 via shaft 24 extending into a portion of cap 32 and cap 33 is coupled to arm 22 via shaft 30 extending into a portion of cap 33. In an example embodiment, vertical wind turbine 100 can include a heater to generate a small amount of heat near bearings to keep the bearings from freezing.

In an example embodiment, at least one of arms 21, 22, housing 23, caps 32, 33, connector 31, band 28, coupling rod 29, shafts 24, 30, bent rod 16 and blades 26 includes non-conductive material, such as porcelain or composite polymer materials.

Figure 1B:
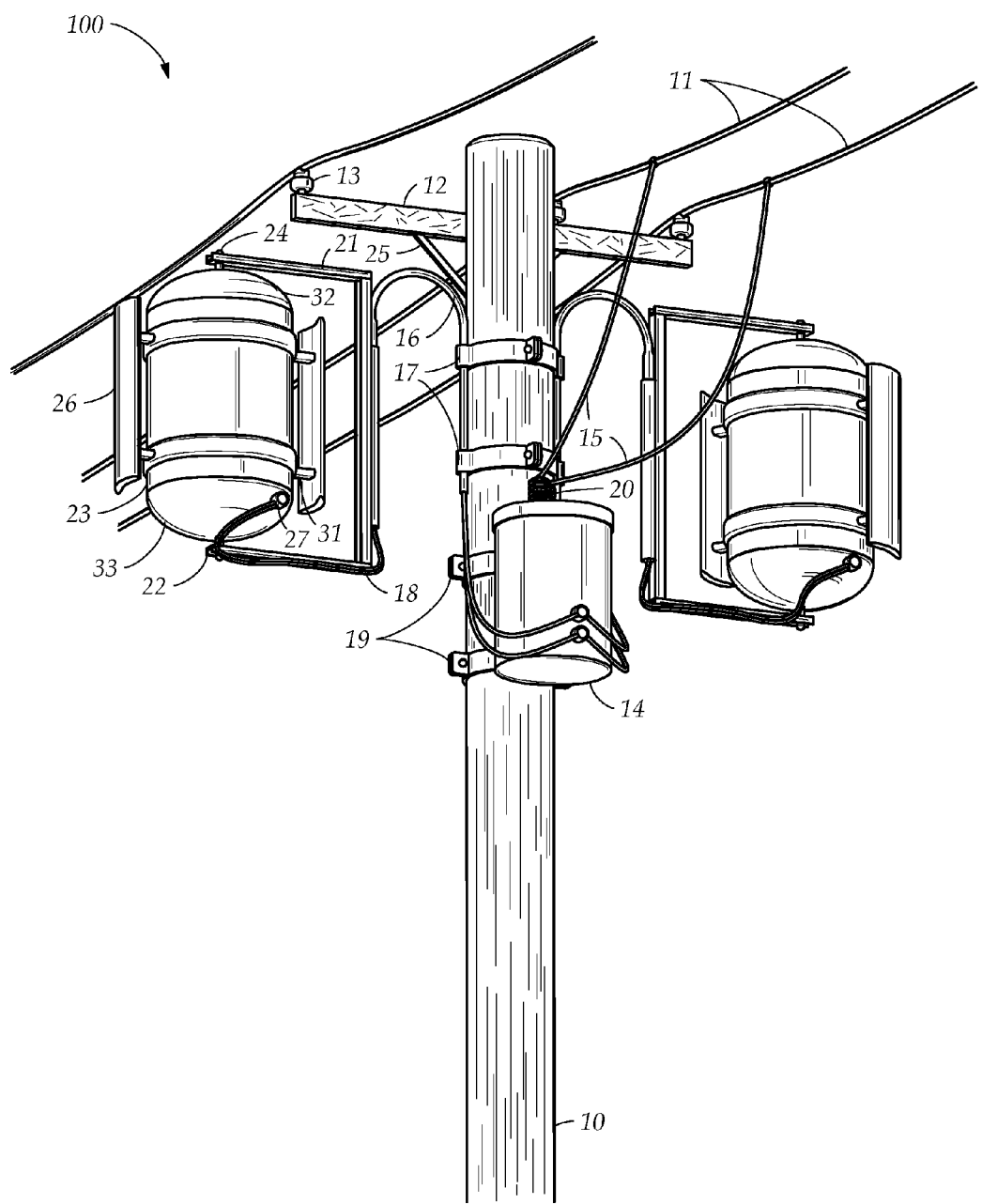
FIG. 1B illustrates another example mode of operation of a vertical axis wind turbine according to the present invention.

FIG. 1B illustrates another example mode of operation of a vertical axis wind turbine according to the present invention. Some elements of FIG. 1B are described above with respect to FIG. 1A. Thus, same reference characters identify same or like components described above and any repetitive detailed description thereof will hereinafter be omitted or simplified in order to avoid complication.

A difference between FIGS. 1A and 1B is a placement of vertical axis wind turbine 100. In FIG. 1B, coupling rod 29 is coupled via bent rod 16 to utility pole 10 below power lines 11. Thus, vertical axis wind turbine is positioned below power lines 11.

In an example embodiment, on utility pole 10, at least one vertical axis wind turbine 100 is positioned below power lines 11 and at least one vertical axis wind turbine 100 is positioned above power lines 11. For example, two opposing vertical axis wind turbines 100 can be positioned below power lines 11 and two opposing vertical axis wind turbines 100 can be positioned above power lines 11. For another example, a plurality of adjacent vertical axis wind turbines 100 can be positioned below/above power lines 11 on one side of utility pole 10 and plurality of adjacent vertical axis wind turbines 100 can be positioned below/above power lines 11 on opposing vertically extending side of utility pole 10.

Figure 2A:
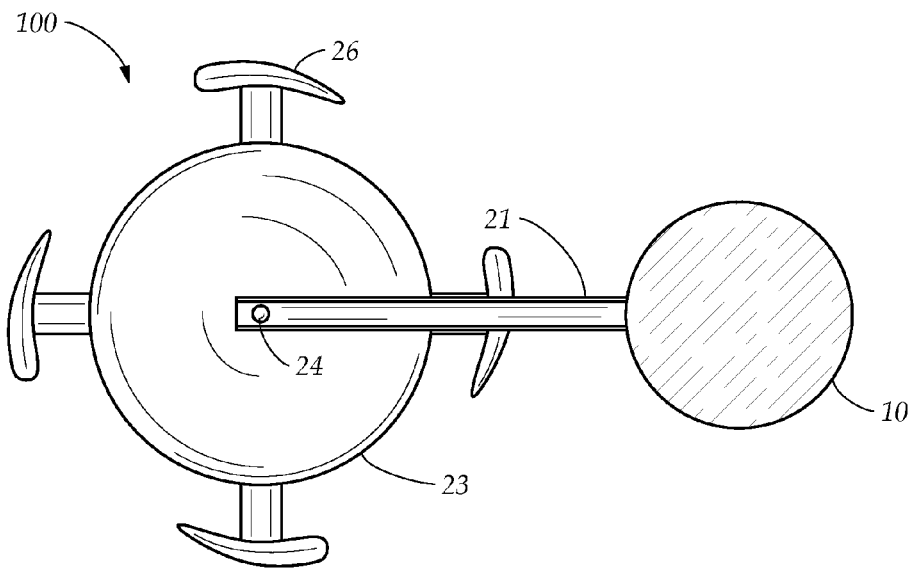
FIGS. 2A and 2B illustrate a top view of an example embodiment of a vertical axis wind turbine in operation according to the present invention.
Figure 2B:
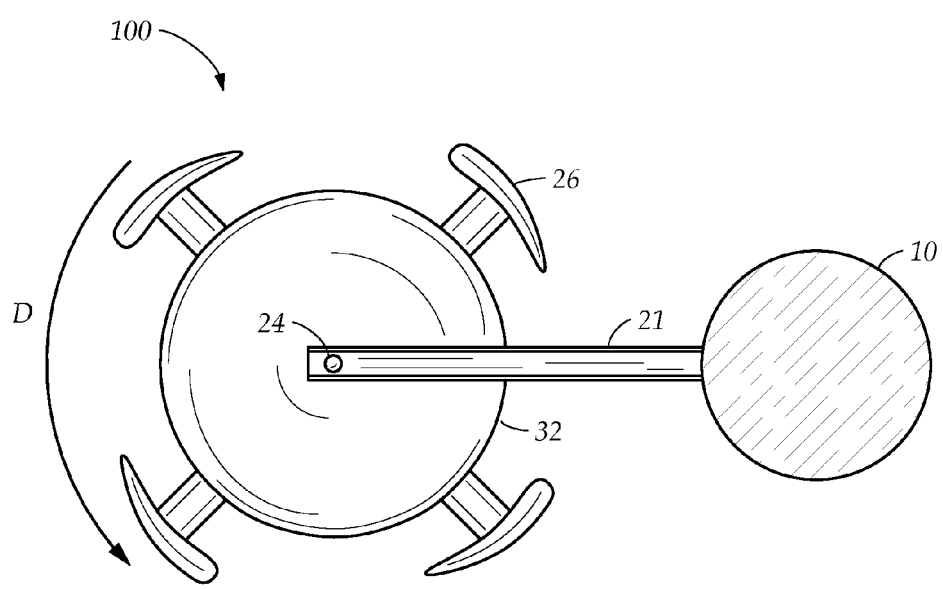

FIGS. 2A and 2B illustrate a top view of an example embodiment of a vertical axis wind turbine in operation according to the present invention.

Vertical axis wind turbine 100 is coupled to utility pole 10 via cap 32, shaft 24 and arm 21.

Vertical axis wind turbine 100 rotates on a vertical axis in a direction D. As vertical axis wind turbine 100 rotates, an electric current is generated by a generator stationed within housing 23.

Figure 3:
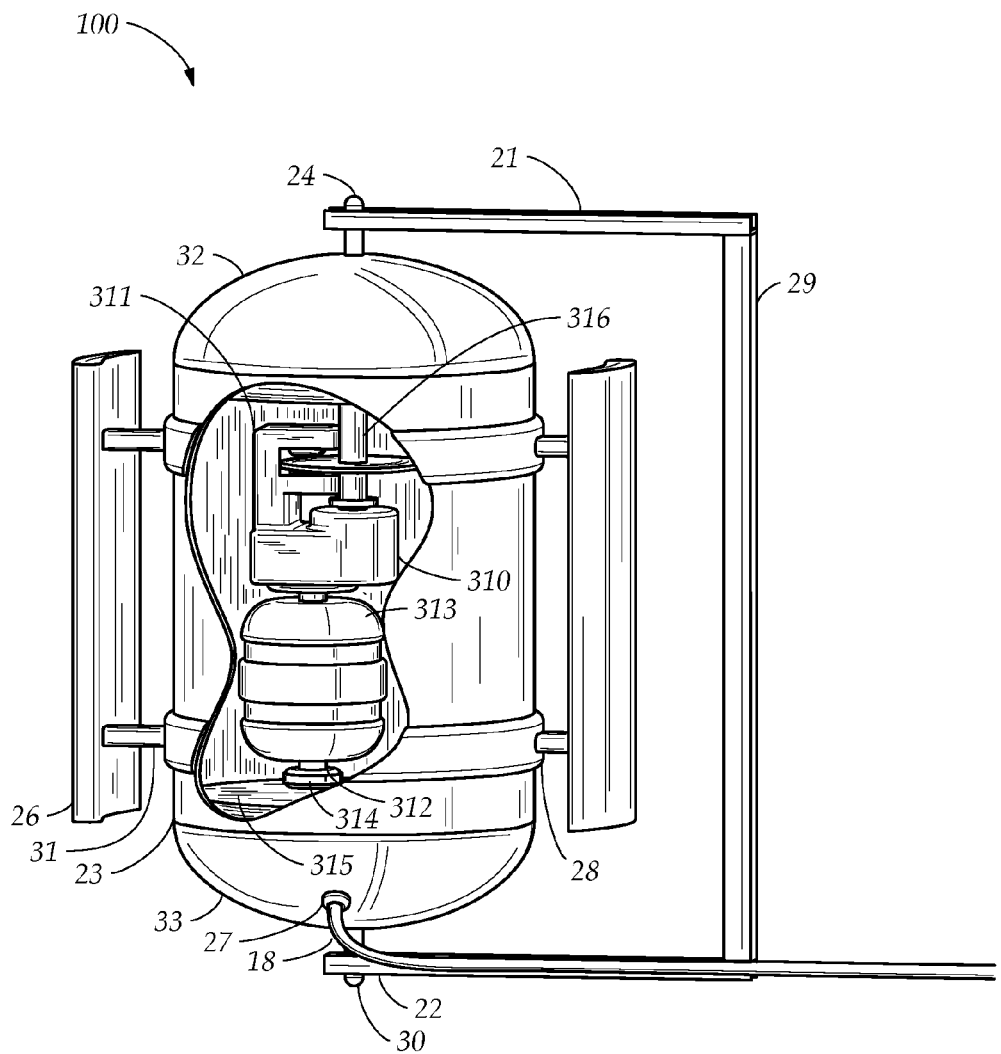
FIG. 3 illustrates a cross-sectional perspective view of an example embodiment of a vertical axis wind turbine according to the present invention.

FIG. 3 illustrates a cross-sectional perspective view of an example embodiment of a vertical axis wind turbine according to the present invention. Some elements of FIG. 3 are described above with respect to FIGS. 1A through 2B. Thus, same reference characters identify same or like components described above and any repetitive detailed description thereof will hereinafter be omitted or simplified in order to avoid complication.

A central shaft 316 extends from an external surface of base of cap 32 into a gear box 310. Central shaft 316 can rotate at a low speed and includes shaft to shaft stabilizing bearings 311. Central shaft 316 includes a first gear wheel mounted thereon. A generator 313 includes a generator shaft 312 with a second gear wheel mounted thereon, which can rotate at a high speed. The first gear wheel meshes with the second gear wheel in gear wheel box 310. Central shaft 316 and generator shaft 312 are parallel to each other. Generator shaft 312 extends from a base 314 mounted on a surface 315 of cap 33 through generator 313 into gear box 310. Generator 313 can include a controller or magnets. Thus, as housing 23 rotates, central shaft 316 rotates and thereby facilitates meshing of gear wheels within gear box 310, which in turn power generator 313 to generate an electric current for conduction via wire 18 to distribution transformer 14.

Figure 4:
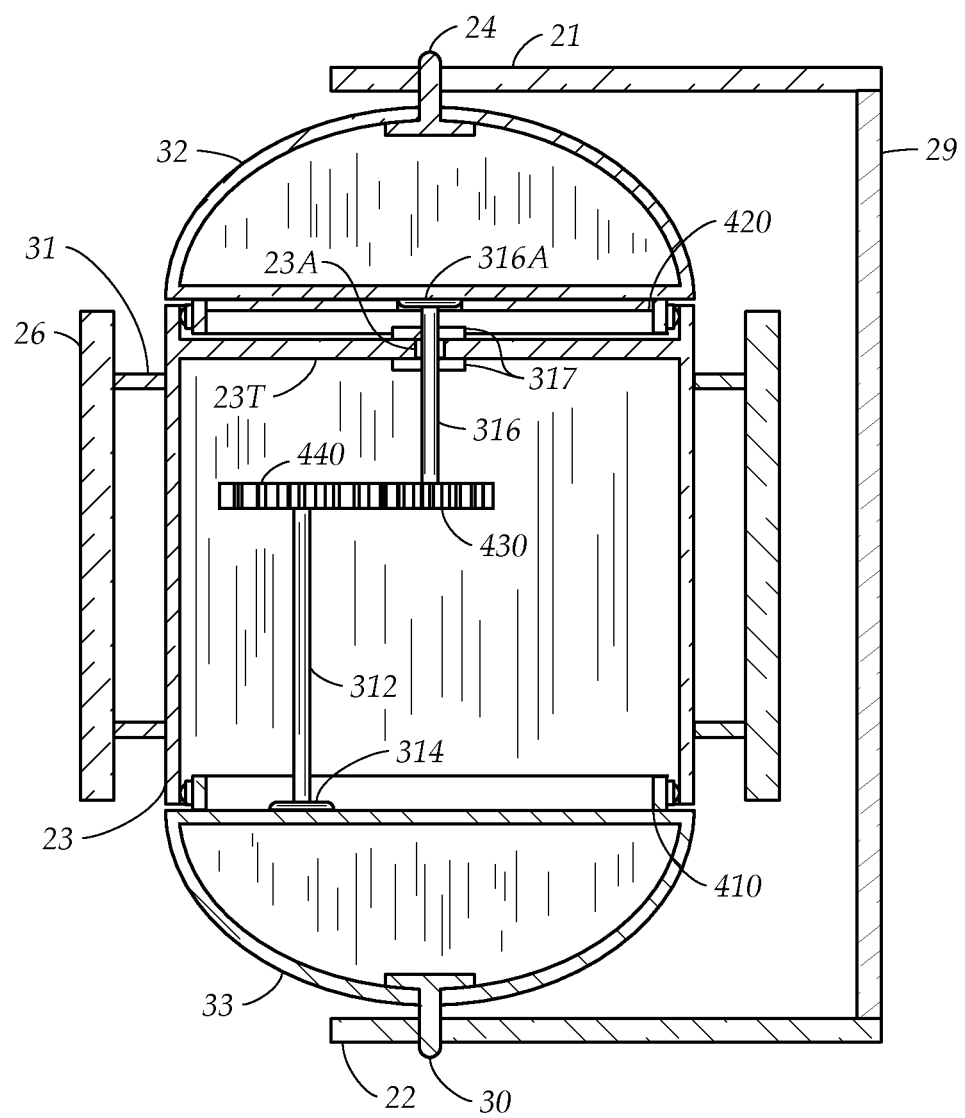
FIG. 4 illustrates a cross-sectional side view of an example embodiment of a vertical axis wind turbine according to the present invention.

FIG. 4 illustrates a cross-sectional side view of an example embodiment of a vertical axis wind turbine according to the present invention. Some elements of FIG. 4 are described above with respect to FIGS. 1A through 3. Thus, same reference characters identify same or like components described above and any repetitive detailed description thereof will hereinafter be omitted or simplified in order to avoid complication.

Cap 32 includes a bearing 420 and cap 33 includes a bearing 410. Using bearings 410, 420 housing 23 rotates on a vertical axis. In an example embodiment, bearings 410, 420 are coupled to a heater to generate a small amount of heat near bearings 410, 420 to keep bearings 410, 420 from freezing.

Housing 23 has a housing roof 23T and a housing side wall. Housing roof 23T is physically connected to the housing side wall. Blades 26 are secured to an external surface of the housing side wall. Housing roof 23T has a central opening 23A through which central shaft 316 extends, but central shaft 316 is also physically connected to housing roof 23T via connection hardware 317. Central shaft 316 is stabilized by a connection to cap 32 via a shaft bearing 316A.

Central shaft 316 includes a first gear wheel 430 and generator shaft 312 includes a second gear wheel 440 meshing with first gear wheel 430 at a meshing point MP. As central shaft 316 rotates with housing 23, first gear wheel meshes with second gear wheel and powers generator 312. Generator shaft 312 is located in an offset position from a central axis of housing 23 and, as previously noted, is secured to base 314 of cap 33 with a lower bearing, which allows axial rotation of generator shaft 312.

In an example embodiment, by incorporating vertical wind turbine, as described above, on already existing infrastructure, energy produced by the turbine reduces a demand for energy from a power plant thereby efficiently creating and distributing renewable energy, decreasing dependency on centralized electric energy generation, lessening fossil fuel use in electricity generation, minimizing foreign energy dependence, reducing the price of electricity, creating a new renewable energy business model, while implementing a job creating solution using an already existing infrastructure. Moreover, the vertical wind turbine can produce electricity incrementally without overloading the electrical grid. Furthermore, by placing the vertical wind turbine on top of the utility poles, whether above or below transmission lines, more wind power can be captured.

In conclusion, herein is presented a utility pole mountable vertical axis wind turbine. The present invention is illustrated by example in the drawing figures and throughout the written description. It should be understood that numerous variations are possible, while adhering to the inventive concept. Such variations are contemplated as being a part of the present invention.

What is claimed is:

1. A vertical axis wind turbine for attaching to a utility pole, the turbine comprising:
   a plurality of support arms, the support arms attach to the utility pole;
   a housing coupled between the arms, the housing includes an outer wall defining a space within the housing, the housing rotates on a vertical axis of rotation and with respect to the arms;
   a generator stationed within the space, the generator generates an electric current in response to a rotation of the housing; and
   a plurality of blades coupled to an external surface of the outer wall, one of the blades extends in a vertical direction, one of the blades is coupled via a band extending around the external surface.

2. The turbine of claim 1, wherein the arms are coupled to each other and one of the blades vertically extends parallel to the external surface.

3. The turbine of claim 1, wherein the arms couple to the utility pole above a power line on the pole.

4. The turbine of claim 1, wherein the arms couple to the utility pole below a power line on the pole.

5. The turbine of claim 1, wherein at least one of the arm, the blade and the housing include a non-conductive material.

6. The turbine of claim 1, further comprising a plurality of caps, each cap having a bearing, wherein the housing is coupled to the arms via the caps and the housing rotates upon the bearings.

7. The turbine of claim 6, wherein a portion of one of the caps is semispherical, the housing is cylindrical, each cap is coupled to an opposing base of the housing and the electric current is an alternating current.

8. The turbine of claim 6, wherein one cap includes an opening for a wire and the generator is coupleable to a distribution transformer via the wire.

9. The turbine of claim 6, further comprising a central shaft extending vertically from one of the caps, the central shaft is coupled to one of the caps while allowing rotation with respect thereto, the central shaft is secured to the housing such that the central shaft rotates as the housing rotates.

10. The turbine of claim 9, wherein the housing has a central axis along which the central shaft is located, a generator shaft is coupled to the generator, the generator shaft is offset from the central axis, the generator shaft is secured to one of the caps for axial rotation thereat.

11. The turbine of claim 10, wherein the central shaft includes a first gear wheel, the generator shaft includes a second gear wheel meshing with the first gear wheel, the central shaft and the generator shaft are parallel to each other.

12. A method of manufacturing a vertical axis wind turbine, the method comprising:
coupling a housing between a plurality of support arms, the arms attach to a utility pole, the housing includes an outer wall defining a space within the housing, the housing rotates on a vertical axis of rotation and with respect to the arms;
stationing a generator within the space, the generator generates an electric current in response to a rotation of the housing;
extending vertically a central shaft from one cap of a plurality of caps, coupling the central shaft to one of the caps while allowing rotation with respect thereto, securing the central shaft to the housing such that the central shaft rotates as the housing rotates, coupling a generator shaft to the generator, wherein the housing is coupled between the arms via the caps, each cap having a bearing, the housing rotates upon the bearings, the housing has a central axis along which the central shaft is located, the generator shaft is offset from the central axis, the generator shaft is secured to one of the caps for axial rotation thereat, the central shaft includes a first gear wheel, the generator shaft includes a second gear wheel meshing with the first gear wheel, the central shaft and the generator shaft are parallel to each other, one cap includes an opening for a wire and the generator is coupleable to a distribution transformer via the wire;
coupling a plurality of blades to an external surface of the outer wall, one of the blades extends in a vertical direction;
coupling the arms to each other;
coupling one of the blades to the external surface via a band extending around the external surface, wherein one of the blades vertically extends parallel to the external surface, at least one of the arms, the blade and the housing include a non-conductive material.

13. A method comprising:
facilitating coupling of a vertical axis wind turbine to a utility pole, the turbine including a plurality of support arms, the support arms attaching to the utility pole, the turbine including a housing coupled between the arms, the housing including an outer wall defining a space within the housing, the housing rotating on a vertical axis of rotation and with respect to the arms, the turbine including a generator stationed within the space, the generator generating an electric current based on rotation of the housing, the turbine including a plurality of blades coupled to an external surface of the outer wall, one of the blades extending in a vertical direction, one of the blades is coupled via a band extending around the external surface;
receiving the generated current from the generator.

14. The method of claim 13, wherein the arms are coupled to each other, one of the blades vertically extends along the external surface.

15. The method of claim 13, wherein at least one of the arms attaching to the utility pole by being at least one of above a power line on the pole and below the power line on the pole.

16. The method of claim 13, wherein the turbine including a central shaft extending vertically from one of the caps, the central shaft is coupled to one of the caps while allowing rotation with respect thereto, the central shaft is secured to the housing such that the central shaft rotates as the housing rotates.

17. The method of claim 16, wherein the turbine having a central axis along which the central shaft is located, the turbine including a generator shaft coupled to the generator, the generator shaft is offset from the central axis, the generator shaft is secured to one of the caps for axial rotation.

18. The method of claim 17, wherein the central shaft includes a first gear wheel, the generator shaft includes a second gear wheel meshing with the first gear wheel, the central shaft and the generator shaft are parallel to each other.

19. The method of claim 13, wherein the turbine including a plurality of caps, each of the caps having a bearing, the housing is coupled to the arms via the caps, the housing rotating based on the bearings.

20. The method of claim 19, wherein one of the caps is semispherical, the housing is cylindrical, the caps are opposing each other.

* * * * *